(12) United States Patent
Rumpf

(10) Patent No.: US 7,675,405 B2
(45) Date of Patent: Mar. 9, 2010

(54) METHOD AND DEVICE FOR TESTING THE MEASURING VALUE OF AT LEAST ONE LEVEL SENSOR ARRANGED IN A FUEL TANK

(75) Inventor: Bernd Rumpf, Nidderau-Windecken (DE)

(73) Assignee: Siemens Aktiengesellschaft, Munich (DE)

( * ) Notice: Subject to any disclaimer, the term of this patent is extended or adjusted under 35 U.S.C. 154(b) by 323 days.

(21) Appl. No.: 11/664,037

(22) PCT Filed: Sep. 28, 2004

(86) PCT No.: PCT/EP2005/054284

§ 371 (c)(1),
(2), (4) Date: Mar. 28, 2007

(87) PCT Pub. No.: WO2006/034937

PCT Pub. Date: Apr. 6, 2006

(65) Prior Publication Data

US 2007/0266762 A1    Nov. 22, 2007

(30) Foreign Application Priority Data

Sep. 28, 2004  (DE) .................. 10 2004 047 071

(51) Int. Cl.
*B60Q 1/00*  (2006.01)
(52) U.S. Cl. .................. 340/450.2; 73/1.73; 73/113; 73/290 R; 340/450; 340/618; 340/623
(58) Field of Classification Search ...... 340/450–450.3, 340/618–625; 73/1.73, 113, 290 R
See application file for complete search history.

(56) References Cited

U.S. PATENT DOCUMENTS

| 4,262,531 | A | 4/1981 | Hewitt |
| 4,890,491 | A | 1/1990 | Vetter |
| 6,397,668 | B1 | 6/2002 | Davison |
| 6,629,547 | B1 | 10/2003 | Yamaguchi |
| 6,792,966 | B2 | 9/2004 | Harvey |
| 6,904,783 | B2 | 6/2005 | Elenich |
| 2002/0178809 | A1 | 12/2002 | Atkinson |
| 2003/0056824 | A1 | 3/2003 | Harvey |
| 2003/0121322 | A1 | 7/2003 | Spillman |
| 2003/0136173 | A1 | 7/2003 | Elenich |
| 2003/0221479 | A1* | 12/2003 | Kim et al. .................. 73/118.1 |

FOREIGN PATENT DOCUMENTS

| DE | 33 26 719 A1 | 1/1984 |
| DE | 199 26 648 A1 | 12/2000 |
| DE | 100 15 919 A1 | 10/2001 |

(Continued)

*Primary Examiner*—Brent Swarthout
(74) *Attorney, Agent, or Firm*—Cohen Pontani Lieberman & Pavane LLP

(57) ABSTRACT

Disclosed is a method and device for testing the measuring value of at least one filling level sensor arranged in a fuel tank. A plurality of measurements are taken by the filling level sensors and are each compared with a physical variable to determine whether the measurements are plausible. If, based on the comparison, the measurements from the sensors are not plausible, a warning signal is fed to a warning device and a warning information item is triggered by the warning device.

22 Claims, 2 Drawing Sheets

FOREIGN PATENT DOCUMENTS

| | | |
|---|---|---|
| DE | 103 00 760 A1 | 8/2003 |
| EP | 1 139 076 A2 | 10/2001 |
| EP | 1 139 077 A2 | 10/2001 |
| EP | 1 236 979 A1 | 9/2002 |
| GB | 2 033 091 A | 5/1980 |
| WO | WO 2004/037595 A1 | 5/2004 |

* cited by examiner

METHOD AND DEVICE FOR TESTING THE MEASURING VALUE OF AT LEAST ONE LEVEL SENSOR ARRANGED IN A FUEL TANK

BACKGROUND OF THE INVENTION

Method and device for testing the measuring value of at least one level sensor arranged in a fuel tank.

The invention relates to a method for checking for faults in the measured value or values of one or more filling level sensors arranged in a fuel tank of a motor vehicle. Defects in the filling level sensors can lead to an incorrect display of the contents of the fuel tank. This entails the risk of the motor vehicle becoming immobile as a result of an empty fuel tank, which is particularly dangerous if this occurs on a freeway.

When there are a plurality of filling level sensors, such as is the case for example in saddle-type fuel tank systems with a plurality of chambers of the fuel tank, the risk of an incorrect display of the contents of the fuel tank is higher the greater the number of filling level sensors.

The object of the invention is therefore a method and a device for carrying out the method of the type mentioned at the beginning by which the fault or faults of the filling level sensor or sensors can be detected.

This object is achieved according to the invention in that the measured values of a plurality of measurements are sensed and are each compared with a further physical variable for plausibility, and in that if they are not plausible a warning signal is fed to a warning device and a warning information item is triggered by the warning device.

As a result of this design, a warning information item is issued immediately after it has been determined that the values are not plausible. The acquisition of a plurality of measurements avoids the possibility of a warning being issued if just one of the plurality of measurements is not plausible but the other measurements are plausible.

The plurality of measurements preferably take place within a specific time period.

A measurement interval with the plurality of measurements can each be triggered after expiry of a specific operating time of the engine or by means of a specific operating function of the motor vehicle.

Such a specific operating function can be the switching on or the switching off of the ignition or an idling mode of the engine.

It is thus not necessary to carry out monitoring continuously but rather only on specific occasions.

In order to acquire the measured values of a plurality of measurements when there is a fuel tank having a plurality of chambers, the measured values of the filling level sensors which are arranged in the chambers are summed and the sum of measured values is compared with the further physical variable for plausibility.

One possibility for a physical variable for determining the plausibility is for the further physical variable to be the value of a quantity of fuel which is extracted from the fuel tank by a fuel pump and which, for the determination of the plausibility, yields an approximately constant value when added to the measured value or values of the filling level sensors for at least a plurality of the measurements.

In another possibility, the physical variable can be the value of the quantity of fuel which is injected into the engine of the motor vehicle by an injection system and which, for the determination of the plausibility, yields an approximately constant value when added to the measured value or values of the filling level sensors for at least a plurality of the measurements.

No further measured values are supplied and it is thus particularly easy that the further physical variable is the measured value of a measurement or the measured value of a plurality of the measurements which, for the determination of the plausibility, yield approximately constant values when they are compared with one another.

The warning information item can be a visual and/or an audible warning information item.

In order to reliably avoid displaying a larger value for the contents of a fuel tank than is actually present, the warning signal can trigger the display of an empty fuel tank on a filling level display.

However, it can also switch on a fault information display.

The second part of the object is achieved with a device for carrying out the method by virtue of the fact that a filling level sensor is arranged in a fuel tank, the measured values of which sensor can be fed to a computer unit and can be compared with one or more measured values of one or more measured values which are determined previously, the computer unit being able to generate a warning signal if the measured value deviates from the previously determined measured values.

This object is also achieved by virtue of the fact that the at least two filling level sensors are arranged in a fuel tank, the measured values of which sensors can be fed to a computer unit and can be summed by the computer unit to form a measured value sum, and can be compared with a measured value sum, of one or more previously determined measured value sums, the computer unit being able to generate a warning signal if the measured value sum deviates from the previously determined measured value sums.

The computer unit can at the same time be used for actuating a filling level display which can display a filling level corresponding to the measured value sum.

One possibility for the warning information item is that a fault information display can be actuated by the warning signal.

However, it is also possible for the filling level display to be actuated by the warning signal.

This can be done, for example, by the filling level display displaying the filling level zero or being actuated so as to flash.

A particularly advantageous application is that the fuel tank is a fuel tank which has a plurality of fuel chambers, at least one filling level sensor being arranged in each chamber.

One of the chambers can be a main chamber and the other chambers can be secondary chambers, a fuel pump by which fuel can be delivered to an internal combustion engine being arranged in the main chamber.

If pumps by which fuel can be delivered from the secondary chambers into the main chamber are arranged in the secondary chambers, a plausibility check is nevertheless possible since the measured value sum of measured values of all the filling level sensors is always formed.

One simple and cost-effective embodiment of the pumps is possible by virtue of the fact that the pumps are suction jet pumps which can be driven by a branch of the delivery current of the fuel pump.

If the fuel pump can be open-loop or closed-loop controlled by the computer unit, only corresponding programming of the computer unit but no separate electronics is required.

BRIEF DESCRIPTION OF THE DRAWINGS

An exemplary embodiment of the invention is illustrated in the drawing and will be described in more detail below. In the drawing.

DETAILED DESCRIPTION OF THE INVENTION

Figure 1:
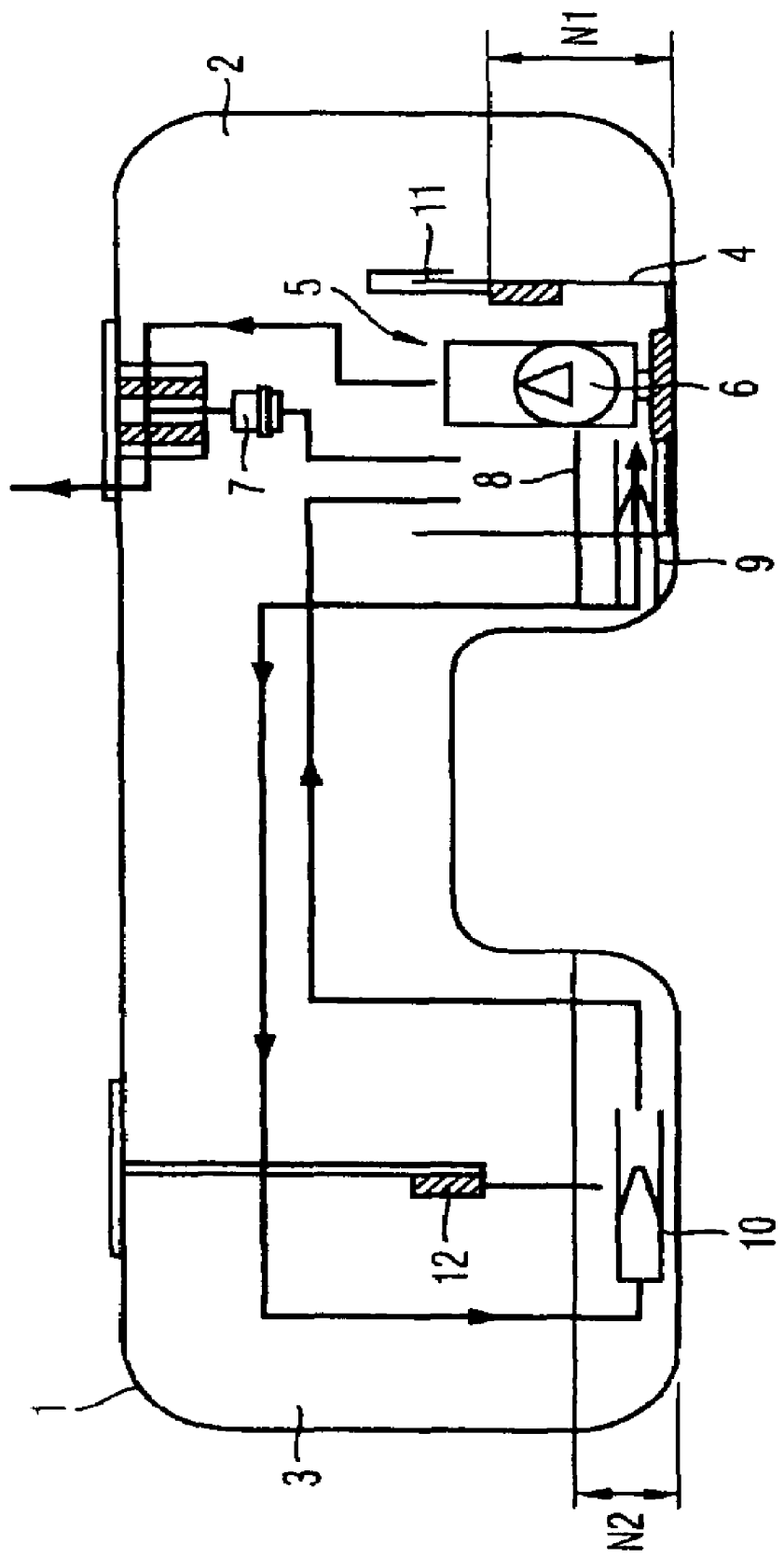
FIG. 1 is a basic illustration of a fuel tank system for a motor vehicle with a fuel tank which has a plurality of chambers.

The fuel tank system illustrated in FIG. 1 has a fuel tank 1 which is embodied as saddle-type tank with two chambers, one chamber being a main chamber 2 and the other chamber being a secondary chamber 3.

In the main chamber 2 there is a surge pot 4 in which a delivery unit 5 with a fuel pump 6 which sucks in fuel from the surge pot 4 and delivers it via a pressure regulator 7 to an injection system (not illustrated) of a motor vehicle is arranged.

The fuel which is decreased by the pressure regulator 7 is fed back into the surge pot 4.

A branch 8 of the delivery current leads off from the delivery unit 5, and, on the one hand, a part of said branch 8 is fed to a first suction jet pump 9 and operates it, the suction jet pump sucking in fuel from the main chamber 2 and delivering it into the surge pot 4.

Another part of the branch 8 of the delivery current is fed into the secondary chamber 3 and operates a second suction jet pump 10 there. This second suction jet pump 10 delivers fuel from the secondary chamber into the surge pot 4.

In the main chamber 2, a first filling level sensor 11 for sensing the respective filling level N 1 is arranged in the main chamber 2 and a second filling level sensor 12 for sensing the respective filling level N 2 in the secondary chamber 3 is arranged in the secondary chamber 3.

Figure 2:
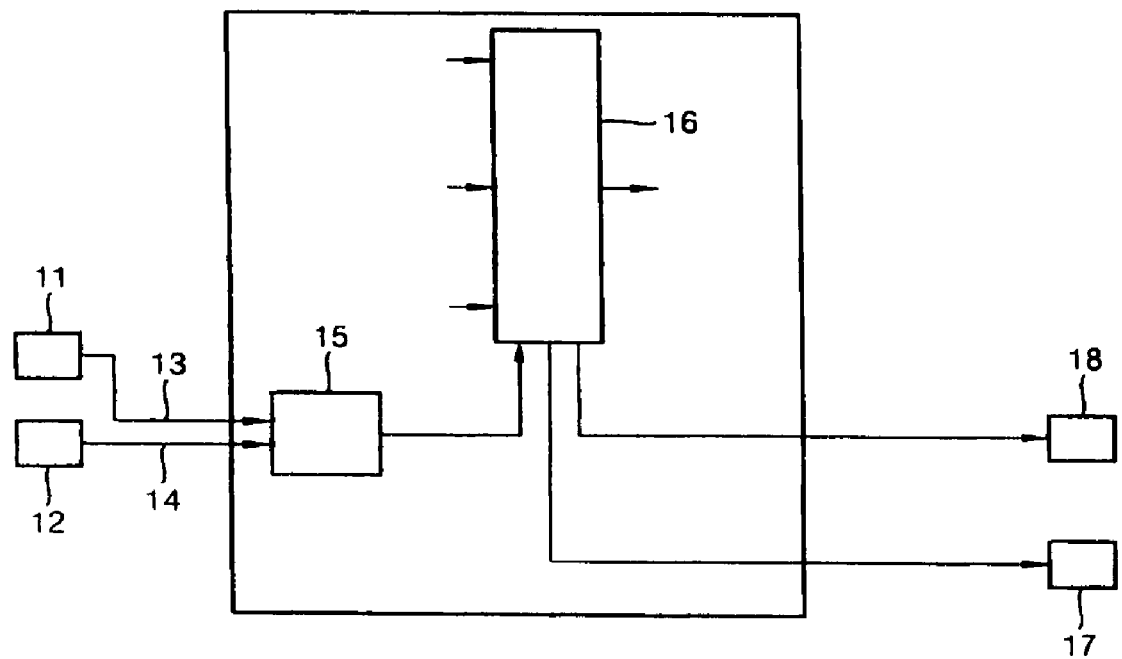
FIG. 2 is a block circuit diagram of a device for carrying out a method for checking the measured values of the filling level sensors of the fuel tank system according to FIG. 1.

According to the block circuit diagram illustrated in FIG. 2, the measured values of the filling level sensors 11 and 12 are supplied to a computer unit 16 via data lines 13 and 14 and via an input unit 15.

In the computer unit 16, the measured values of the two filling level sensors 11 and 12 are summed to form a measured value sum, and a corresponding filling level signal is supplied for actuating a filling level display 17 which, after previous attenuation and averaging, can be arranged in a display panel of the motor vehicle and displays the overall filling level of the fuel tank 1.

Furthermore, for example five measured value sums which are determined at brief time intervals in succession are stored in the computer unit 16 and the last measured value sum determined is compared with the four previously determined measured value sums.

However, the five measured value sums can also be compared with one another.

If at least the majority of the measured value sums which are compared with one another are approximately the same, the computer unit 16 detects the measured value sums as being plausible. This means that the filling level sensors 11 and 12 and the means of transmitting their measured values to the computer unit are satisfactory.

An absolute identity of the measured value sums is not necessary since splashing effects of the fuel due to dynamic driving movements affect the measured value. Furthermore, the quantity of fuel which is required for the injection system also has an effect. The measured value sums must therefore be located only within a tolerance band in order to be considered identical by the computer unit 16.

If the majority of the measured value sums which are compared with one another are not approximately the same, the computer unit 16 generates a warning signal and supplies it to a fault information display 18 and actuates the latter.

At the same time, the filling level display 17 can be actuated by the computer unit 16 in such a way that it displays an empty fuel tank 1.

This indicates that either one or both filling level sensors 11 and 12 or their means of transmitting measured values to the computer unit 16 are not satisfactory.

The invention claimed is:

1. A method for checking for errors in a measured value or a plurality of measured values obtained by a plurality of filling level sensors arranged in a fuel tank of a motor vehicle, comprising:

sensing, at each of said plural filling level sensors, measured values of a plurality of measurements;

comparing, at a computer unit of the motor vehicle, a sum of said plural measured values with a further physical variable for plausibility; and providing a warning signal to a warning device and triggering a warning information item by the warning device if a sum of said plural measured values is not plausible.

2. The method as claimed in claim 1, wherein each of said plural measurements occurs within a specific time period.

3. The method as claimed in claim 2, wherein each of said plural measurements is triggered after expiry of a specific operating time of an engine of the motor vehicle.

4. The method as claimed in claim 2, wherein each of said plural measurements is triggered by a specific operating function of the motor vehicle.

5. The method as claimed in claim 4, wherein the specific operating function is switching off an ignition of the motor vehicle or an idling mode of the engine of the motor vehicle.

6. The method as claimed in claim 1, wherein when the fuel tank includes a plurality of chambers, respective measured values of each of said plural filling level sensors which are arranged in said plural chambers are summed and the sum of said respective measured values is compared with the further physical variable to determine plausibility of said plural measured values.

7. The method as claimed in claim 1, wherein the further physical variable is a value of a quantity of fuel which is extracted from the fuel tank by a fuel pump and which, for determining the plausibility of said plural measured values, yields an approximately constant value when added to the measured value or said plural measured values of each of said plural filling level sensors for at least said plural measurements.

8. The method as claimed in claim 1, wherein the further physical variable is a value of a quantity of fuel which is injected into an engine of the motor vehicle by an injection system and which, for determining the plausibility of said plural measured values, yields an approximately constant value when added to the measured value or said plural measured values of each of said plural filling level sensors for at least said plural measurements.

9. The method as claimed in claim 1, wherein the further physical variable is one of the measured value of a measurement and said measured values of said plural measurements which, for determining the plausibility of said plural measured values, yield approximately constant values when compared with one another.

10. The method as claimed in claim 1, wherein the warning information item is at least one of a visual and an audible warning information item.

11. The method as claimed in claim 10, wherein the warning signal triggers a display of an empty fuel tank indication on a filling level display of the motor vehicle.

12. The method as claimed in claim 10, wherein the warning signal switches on a fault information display.

13. A device for checking for errors in a measured value or a plurality of measured values, comprising:
   a plurality of filling level sensors arranged in a fuel tank of a motor vehicle, the measured values of each of said plural filling level sensors being summed together and supplied to a computer unit and compared with one or more measured values which are determined previously, the computer unit being operable to generate a warning signal if the summed measured value of each of said plural filling level sensors deviates from the previously determined one or more measured values.

14. The device as claimed in claim 13, wherein two filling level sensors are arranged in the fuel tank, the measured values of said two filling level sensors being supplied to the computer unit and summed by the computer unit to form a measured value sum, and being compared with the measured value sum of one or more previously determined measured value sums, the computer unit being operable to generate a warning signal if the measured value sum deviates from the previously determined measured value sums.

15. The device as claimed in claim 14, wherein the computer unit is configured to actuate a filling level display which is configured to display a filling level corresponding to the measured value sum.

16. The device as claimed in claim 15, further comprising a fault information display which is actuatable by the warning signal.

17. The device as claimed in claim 15, wherein the filling level display is actuatable by the warning signal.

18. The device as claimed in claim 14, wherein the fuel tank includes a plurality of fuel chambers, at least one filling level sensor being arranged in each of said plural fuel chambers.

19. The device as claimed in claim 18, wherein one of said plural chambers is a main chamber and another of said plural chambers is a secondary chamber, a fuel pump by which fuel is deliverable to an internal combustion engine being arranged in the main chamber.

20. The device as claimed in claim 19, wherein pumps by which fuel is deliverable from the secondary chamber into the main chamber are arranged in the secondary chamber.

21. The device as claimed in claim 20, wherein the pumps are suction jet pumps which are driveable by a branch of a delivery current of the fuel pump.

22. The device as claimed in claim 19, wherein the fuel pump is controllable by the computer unit in one of an open-loop and closed-loop manner.

* * * * *